US008246083B2

(12) United States Patent  (10) Patent No.: US 8,246,083 B2
Ferrali  (45) Date of Patent: Aug. 21, 2012

(54) SYSTEM FOR RECIPROCALLY BLOCKING MECHANICAL ELEMENTS DEFINING A PRESSURIZED COMPARTMENT

(75) Inventor: Luigi Ferrali, Florence (IT)

(73) Assignee: Pentair International SÁRL, Lausanne (CH)

( * ) Notice: Subject to any disclaimer, the term of this patent is extended or adjusted under 35 U.S.C. 154(b) by 502 days.

(21) Appl. No.: 12/282,681

(22) PCT Filed: Mar. 1, 2007

(86) PCT No.: PCT/IT2007/000146
§ 371 (c)(1),
(2), (4) Date: Dec. 31, 2008

(87) PCT Pub. No.: WO2007/105245
PCT Pub. Date: Sep. 20, 2007

(65) Prior Publication Data
US 2009/0212556 A1  Aug. 27, 2009

(30) Foreign Application Priority Data

Mar. 15, 2006 (IT) ................................ FI2006A0074

(51) Int. Cl.
*F16L 37/00* (2006.01)

(52) U.S. Cl. ........................................ 285/305; 285/81

(58) Field of Classification Search .................. 285/331, 285/39, 305, 321, 308, 309, 310, 307, 336, 285/349, 18, 23, 24, 27, 81, 91, 82; 403/378, 403/379.1–379.5, DIG. 7
See application file for complete search history.

(56) References Cited

U.S. PATENT DOCUMENTS

| 360,663 | A | * | 4/1887 | Daniels | 285/18 |
| 1,464,386 | A | * | 8/1923 | Ingram | 285/305 |
| 2,751,238 | A | * | 6/1956 | Vegren | 403/316 |
| 2,805,089 | A | * | 9/1957 | Hansen | 285/321 |
| 3,427,047 | A | * | 2/1969 | Mayo | 285/305 |
| 3,600,011 | A | * | 8/1971 | Alvis | 285/305 |
| 3,637,239 | A | * | 1/1972 | Daniel | 285/93 |
| 3,871,691 | A | * | 3/1975 | Takagi et al. | 285/321 |
| 4,138,146 | A | * | 2/1979 | Rumble | 285/39 |
| 4,407,482 | A | * | 10/1983 | Daghe et al. | 251/148 |
| 4,819,968 | A | * | 4/1989 | Abe | 285/81 |
| 4,926,895 | A | * | 5/1990 | Gailey | 137/15.09 |
| 5,513,882 | A | * | 5/1996 | Lewis | 285/305 |
| 6,932,391 | B2 | | 8/2005 | Lebreton et al. | |
| 6,932,392 | B1 | | 8/2005 | Geislhardt | |

FOREIGN PATENT DOCUMENTS

| DE | 35 37 502 | 4/1987 |
| EP | 0 612 951 | 8/1994 |
| WO | WO 99/40355 | 8/1999 |

* cited by examiner

*Primary Examiner* — Aaron Dunwoody
(74) *Attorney, Agent, or Firm* — McGlew and Tuttle, P.C.

(57) ABSTRACT

The system comprises a first substantially annular seat (159) provided in a first wall (155A) defined by the first mechanical element (155); and a second substantially annular seat (161A, 161B) provided in a second wall (153A) defined by the second mechanical element (1). When the two mechanical elements are assembled the second substantially annular seat is positioned approximately at the level of the first substantially annular seat and the second wall is inside the first wall. The connection system between the mechanical elements also comprises at least one filiform element (157) forming a member for reciprocal blocking of the two mechanical elements, which is inserted in a space defined by the two opposed annular seats. Moreover, there is also provided a forcing member (173), insertable in a space defined between two opposed surfaces belonging respectively to the first and to the second mechanical element.

1 Claim, 6 Drawing Sheets

SYSTEM FOR RECIPROCALLY BLOCKING MECHANICAL ELEMENTS DEFINING A PRESSURIZED COMPARTMENT

TECHNICAL FIELD

The present invention relates to a device or a system to block two mechanical elements with respect to each other, and more specifically two mechanical elements defining a compartment for a pressurized fluid, which forces said two mechanical elements to move reciprocally away from each other.

STATE OF THE ART

In numerous applications in particular, although not exclusively, in the hydraulic field, there is the need to reciprocally constrain two mechanical elements that are forced to detach from each other due to the pressure of a fluid (liquid or gas) contained in a specific volume inside which a pressurized fluid is contained, which forces the two mechanical elements to move away from each other.

For example, there are hydraulic multiport valves that are applied to a base, for example of a resin regeneration system of water softening plants. The reciprocal connection between body of the valve and base is currently implemented with a system of screws and nuts, which requires a considerable amount of time to perform connection or to release the two parts.

U.S. Pat. No. 6,932,391 describes a system for reciprocally constraining a body of a bottle to an annular element inserted in the mouth of the bottle. In one of the embodiments illustrated, the connection system provides for a filiform blocking element with a circular cross section, which is inserted in a seat with a circular cross section, defined in part in the body of the bottle and in part in the annular element. Insertion of the filiform blocking element is particularly difficult, if not impossible, unless the seat is produced with a section with oversized diameter with respect to the cross section of the filiform element. In this case, however, the two members constrained by the filiform element are constrained with a certain degree of clearance which can be detrimental also for the purposes of reciprocal sealing, notwithstanding the presence of an annular seal.

OBJECTS AND SUMMARY OF THE INVENTION

An object of the present invention is to provide a device, system or arrangement of members to removably constrain two mechanical elements to each other, which overcomes entirely or in part the drawbacks of prior art devices.

An object of a particular embodiment of the invention is to provide a device with which the mechanical elements can be constrained without clearance but at the same time without being difficult to assemble and without detriment to the reciprocal seal therebetween.

In substance, according to a first aspect, the invention relates to a device for constraining a first mechanical element and a second mechanical element to each other, couplable to each other to define a compartment for holding a fluid, comprising: a first substantially annular seat provided in a first wall defined by the first mechanical element; a second substantially annular seat provided in a second wall defined by the second mechanical element; when the two mechanical elements are assembled said second substantially annular seat being positioned approximately at the level of said first substantially annular seat, the second wall being positioned inside the first wall; at least one filiform element forming a reciprocal blocking member of said first and second mechanical element, said filiform element being inserted in a space defined by said first seat and by said second seat. Characteristically, there is also provided at least one forcing member insertable in a space defined between two opposed surfaces belonging respectively to the first and to the second mechanical element, to force the first and the second mechanical element to move reciprocally. Moreover, the first and the second substantially annular seats are shaped so that insertion of the forcing member in the space causes blocking of the filiform element between the two substantially annular seats.

According to an advantageous embodiment, the first wall and the second wall extend substantially cylindrically, are positioned one around the other and are coaxial with each other. The forcing member forces the first and the second mechanical element to move one with respect to the other in a direction parallel to the common axis of the two substantially cylindrical walls.

To obtain easy insertion of the filiform blocking element and reciprocal clamping without clearance of the two mechanical elements, according to an advantageous embodiment one of the two annular seats in which the filiform blocking element is housed has a cross section comprising a first portion of greater depth and a second portion of lesser depth. The two portions are positioned consecutive to each other in a direction parallel to the direction according to which the two mechanical elements are moved due to insertion of said forcing member. When the forcing member is inserted the filiform element is blocked in the second portion of lesser depth of said substantially annular seat.

Further advantageous features and embodiments of the device according to the invention are set forth in the appended claims and will be described in greater detail hereunder with reference to a non-limiting example of embodiment of the invention.

BRIEF DESCRIPTION OF THE DRAWINGS

The invention will be better understood by following the description and accompanying drawing, which shows a non-limiting practical embodiment of the invention. More specifically, in the drawing.

DETAILED DESCRIPTION OF THE PREFERRED EMBODIMENT OF THE INVENTION

Figure 1:
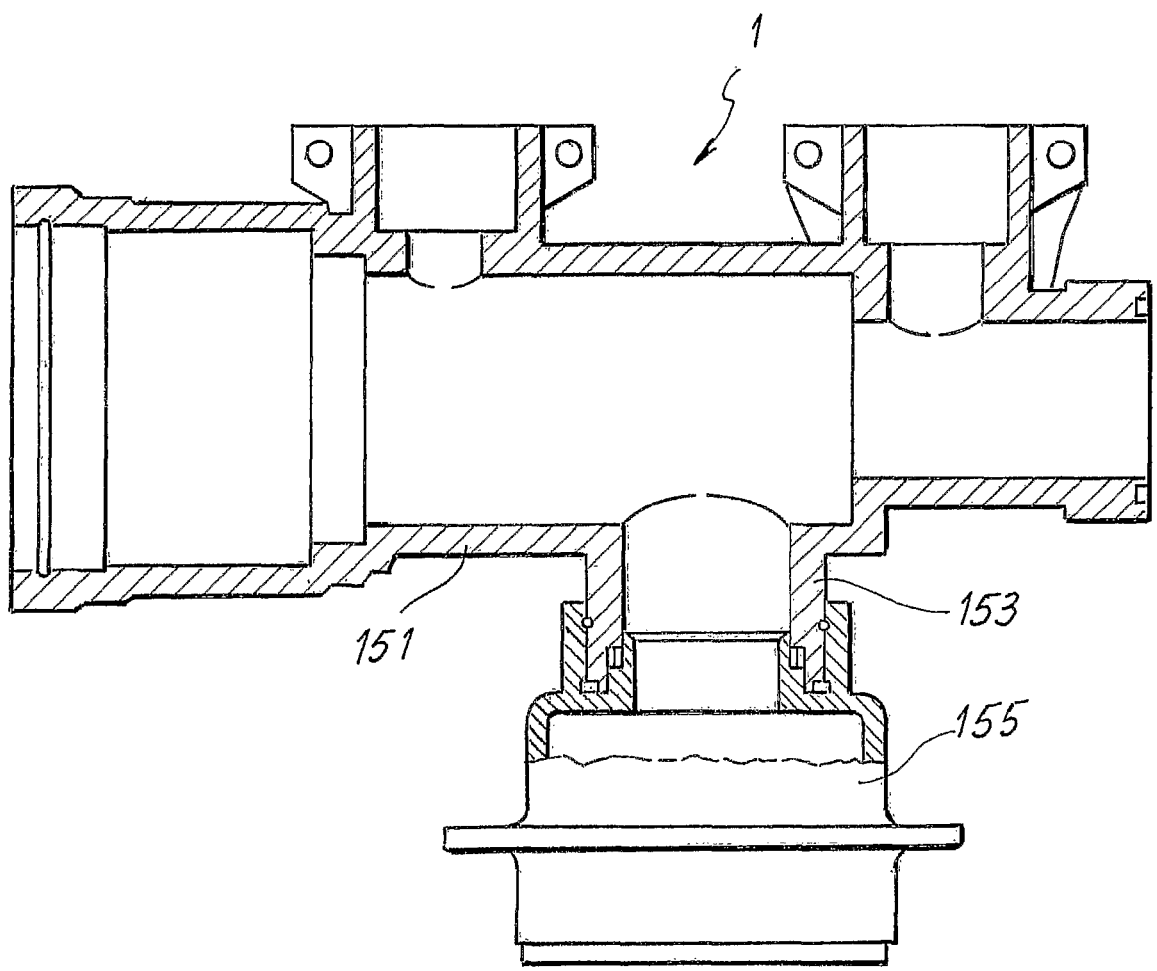
FIG. 1 shows a longitudinal section of the body of a multiway valve and of a base to which said valve must be connected.

The drawing illustrates a particularly advantageous and preferred application of the system or arrangement for reciprocal blocking of two mechanical elements according to the invention. In particular, this is an application wherein a multiport valve must be removably constrained to a base element. The body of the valve, or rather one of the parts that define a port of the valve, represents the first mechanical element that must be constrained on a second mechanical element, composed of a base, such as a portion of a softening plant.

However, it must be understood that this system can also be used to reciprocally block mechanical elements of other types.

Figure 2:
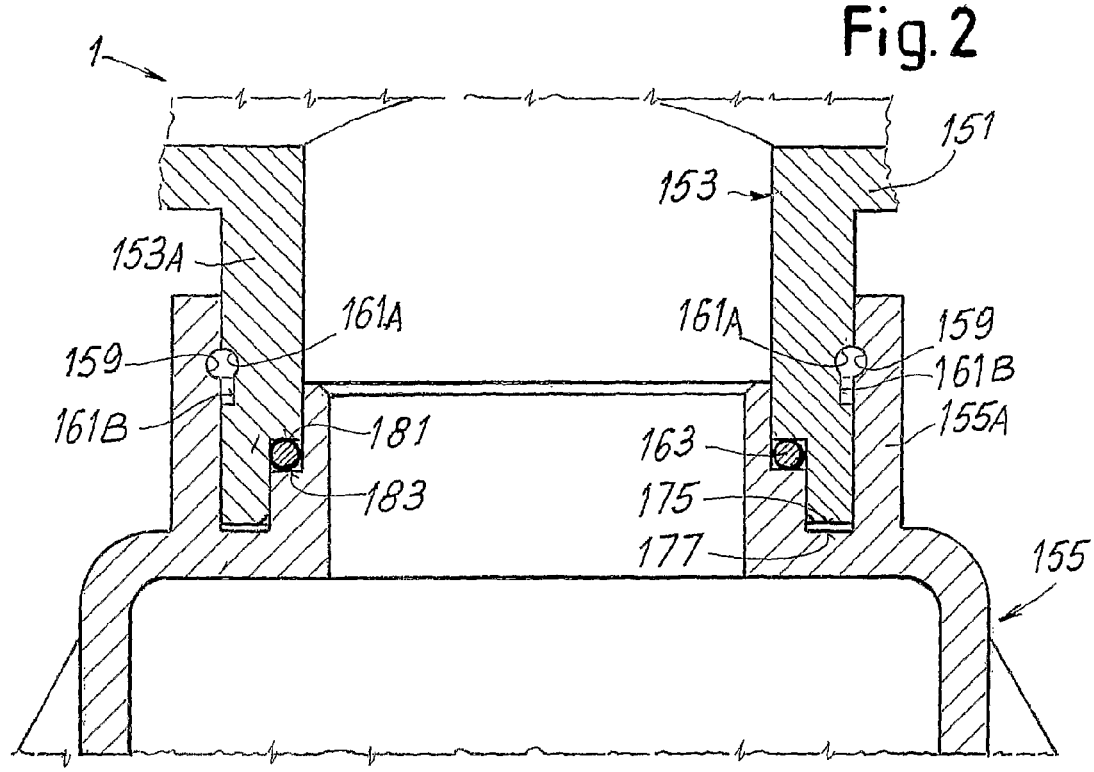
FIGS. 2 and 3 show enlarged longitudinal sections of the connection area between the body of the valve and the base.
Figure 3:
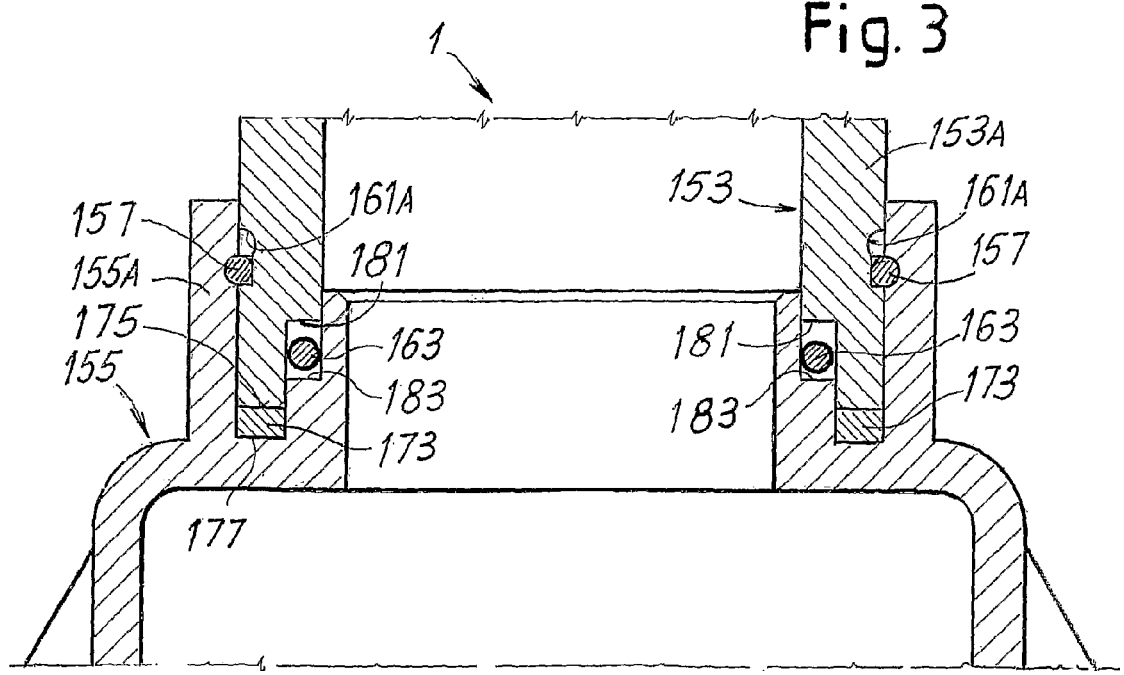
Figure 4:
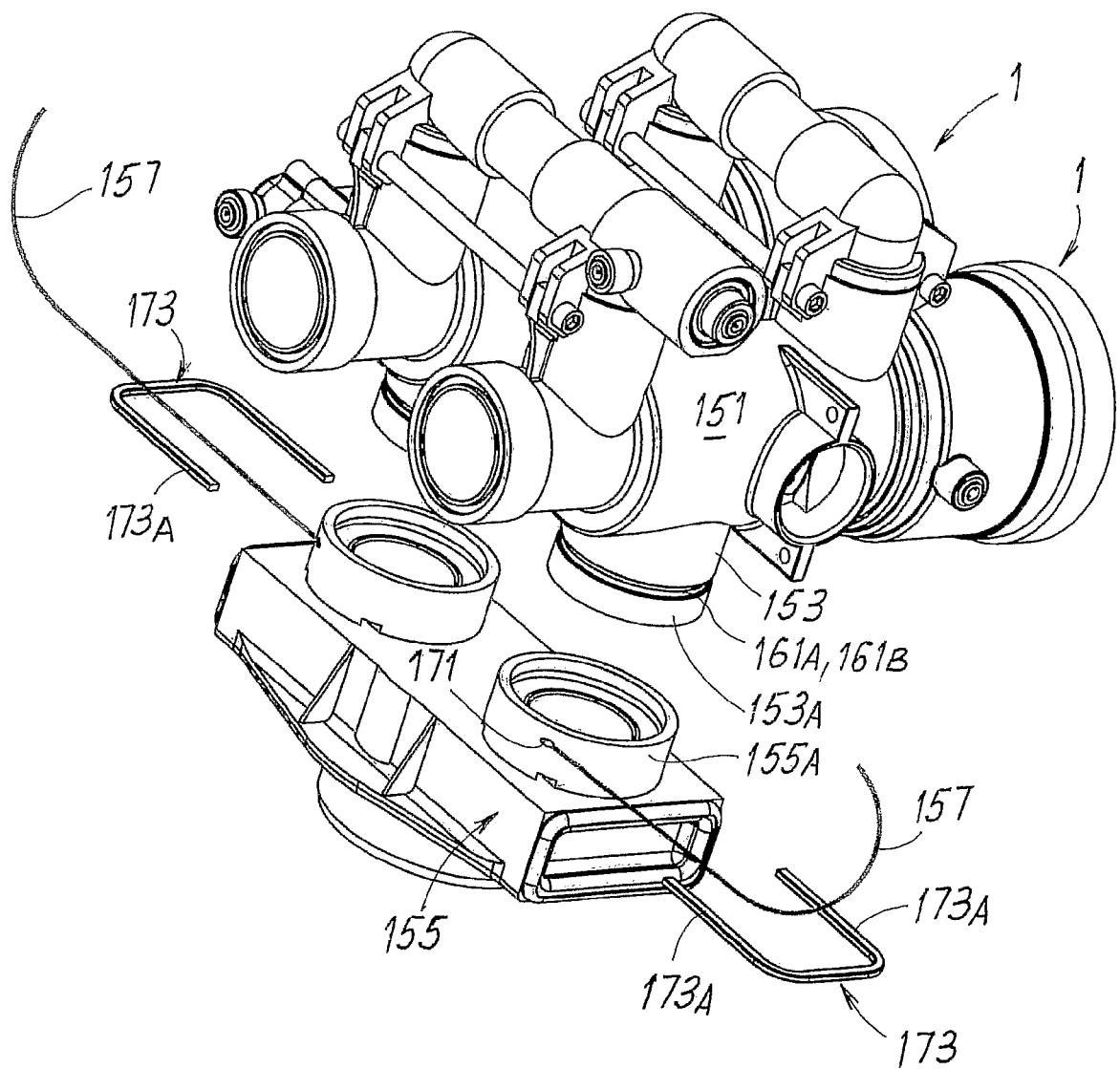
FIGS. 4 and 5 show an axonometric view of the coupling system between the body of the valve and the base in a released and blocked arrangement respectively, in a configuration with double valve, wherein two substantially identical valves are assembled and blocked on a common base by means of an arrangement identical to the one shown in section in FIGS. 2 and 3.
Figure 5:
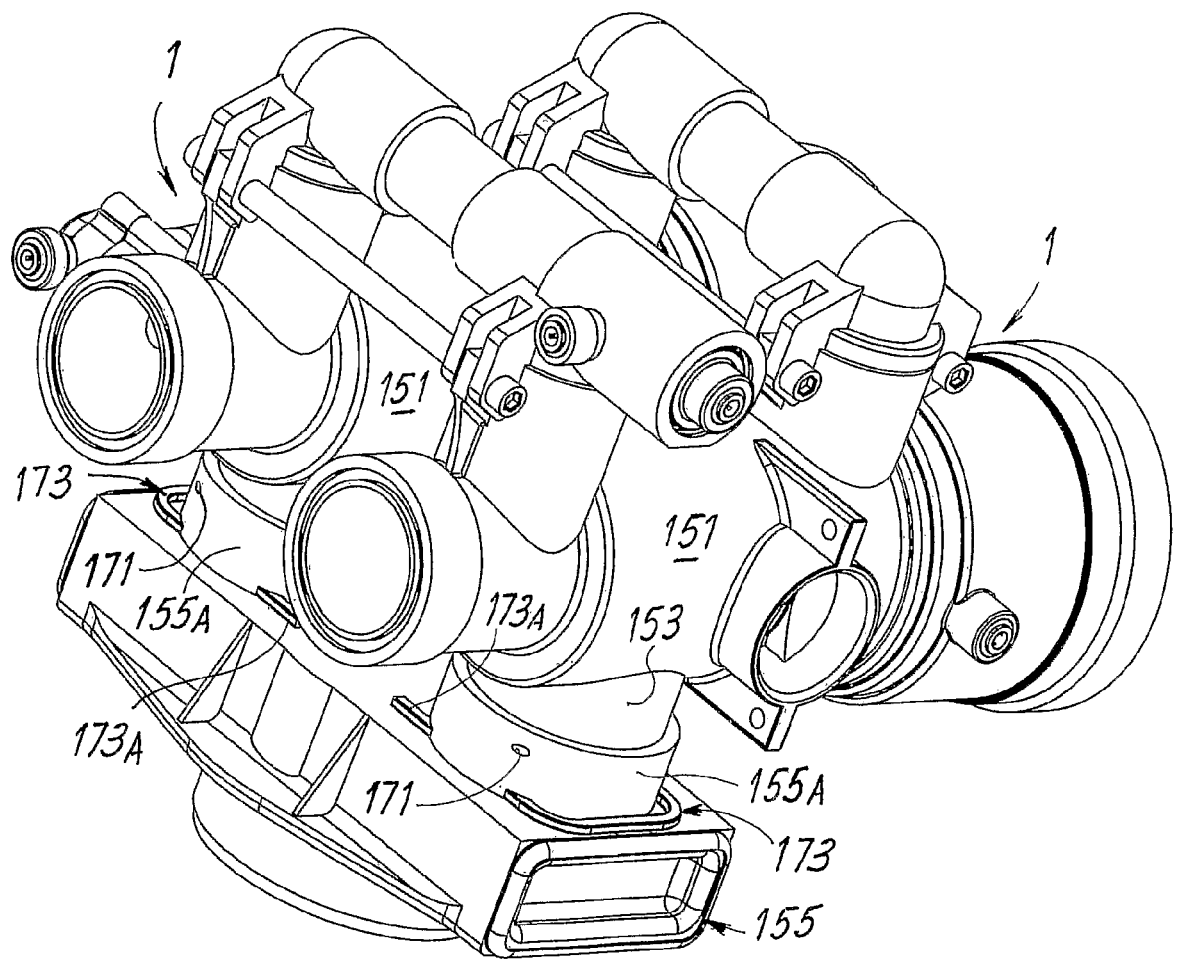

In the drawing, FIG. 1 shows a longitudinal section of a body of the valve, FIGS. 2 and 3 show an enlarged detail and FIGS. 4 and 5 show an axonometric view of a configuration with double valve, respectively released from and blocked on the base.

The body of the valve 1 is indicated with 151. It has a connector 153 by means of which the body of the valve is constrained to a base 155. The connector 153 forms a first mechanical element joined to the second mechanical element, composed by the base 155, with a filiform element 157, inserted in a space delimited by two substantially annular seats, of which 161A and 161B indicate the seat produced in a first substantially cylindrical wall 153A of the connector 153, while 159 indicates a second seat produced in a substantially cylindrical wall 155A of the base 155. The two substantially cylindrical walls 153A, 155A are concentric and coaxial.

In the example of embodiment illustrated, the filiform blocking element 157 has a circular cross section; however, it could also have a different structure, e.g. elliptical and more generally a cross section with a convex profile.

In the example shown in the drawing, the annular seat 159 provided in the wall 155A of the base 155 has a semi-circular cross section, while the seat 161A, 161B provided on the outer surface of the wall 153A of the connector 153 is formed by two adjacent portions: the first portion 161A has a semi-circular cross section, substantially identical to that of the seat 159, while the portion 161B has a rectangular section of a lesser depth with respect to the depth of the portion 161A.

In the position in FIG. 2, the walls 153A, 155A are arranged so that the annular seat 159 provided on the inner surface of the wall 155A is in front of the portion 161A of the opposed seat produced in the wall 153A, so as to define a toroidal volume whose cross section is approximately the same as that of the filiform blocking element 157 and preferably has a slightly oversized diameter with respect to the diameter of the cross section of said filiform element. This allows easy insertion of the filiform element in the circular seat thus defined.

The filiform blocking element 157 is inserted through a tangentially inclined through hole 171 (FIG. 4) provided in the cylindrical wall 155A of the base 155. When the filiform blocking element 157 has been inserted in its seat, the two members 153, 155 are forced so that they move with respect to each other in the direction of the common axis of the two cylindrical walls 153A, 155A. This movement causes the annular seat 159 provided in the cylindrical wall 155A to approximately coincide with the portion 161B of the annular seat produced in the cylindrical wall. This position is shown in FIG. 3. As the portion of annular seat 161B is of lesser depth with respect to the portion 161A, the dimension in a radial direction of the toroidal volume delimited by the seat 159 and by the portion 161B is less than the diameter of the filiform element 157, which is consequently compressed and radially forced in the seat, with elimination of clearance between the two mechanical elements 153 and 155.

This forcing is obtained by inserting each end 173A (preferably provided with a chamfer or with a cuneiform portion) of a fork 173 in respective spaces delimited between two opposed surfaces 175, 177 belonging to the mechanical element 153 and to the mechanical element 155 respectively. The surface 177 is produced in the base of an annular groove formed in the base 155, while the surface 175 is represented by the front surface of the wall 153A of the connector 153.

The number 163 indicates a seal ring housed in a seat defined between two shoulders 181, 183 produced on the body 153 of the valve and on the base 155 respectively.

With the arrangement described and illustrated reciprocal blocking of the mechanical elements 153 and 155 is obtained with elimination of clearance and with optimal seal therebetween. Reciprocal disassembly of the two elements requires extraction of the fork 173 and discharge of the pressure in the inner volume delimited by the mechanical elements 153, 155, as unless this pressure is discharged the filiform blocking element 163 cannot be extracted from its housing. This makes the blocking device intrinsically safe as (unlike other known blocking means, such as screwed flanges, Seeger rings or the like) opening cannot be obtained unless there is no internal overpressure. At the same time, the blocking arrangement allows rapid assembly of the members.

Figure 6:
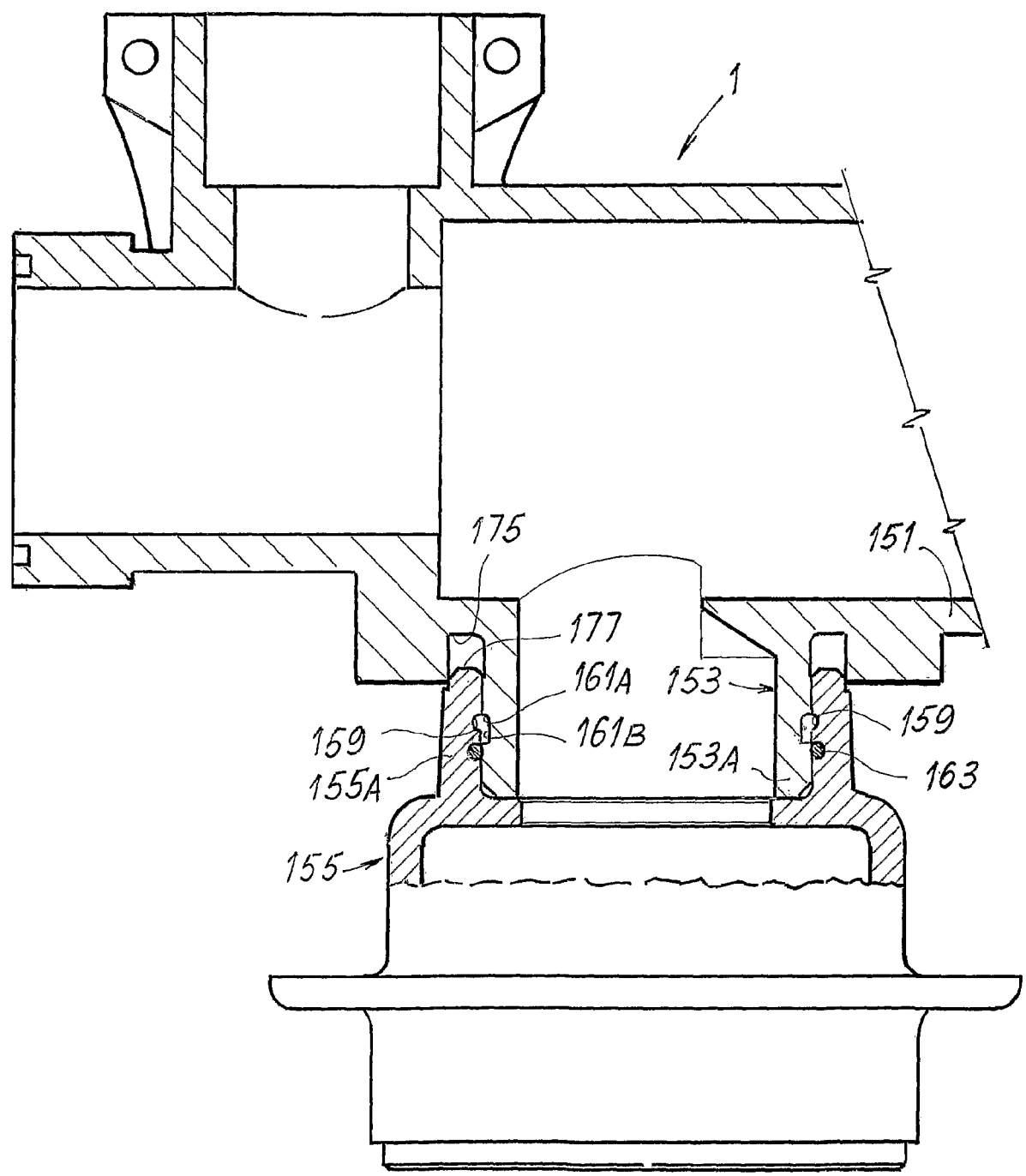
FIGS. 6 and 7 show a cross section of a modified embodiment of the invention, in the position before and after blocking of the two elements.
Figure 7:
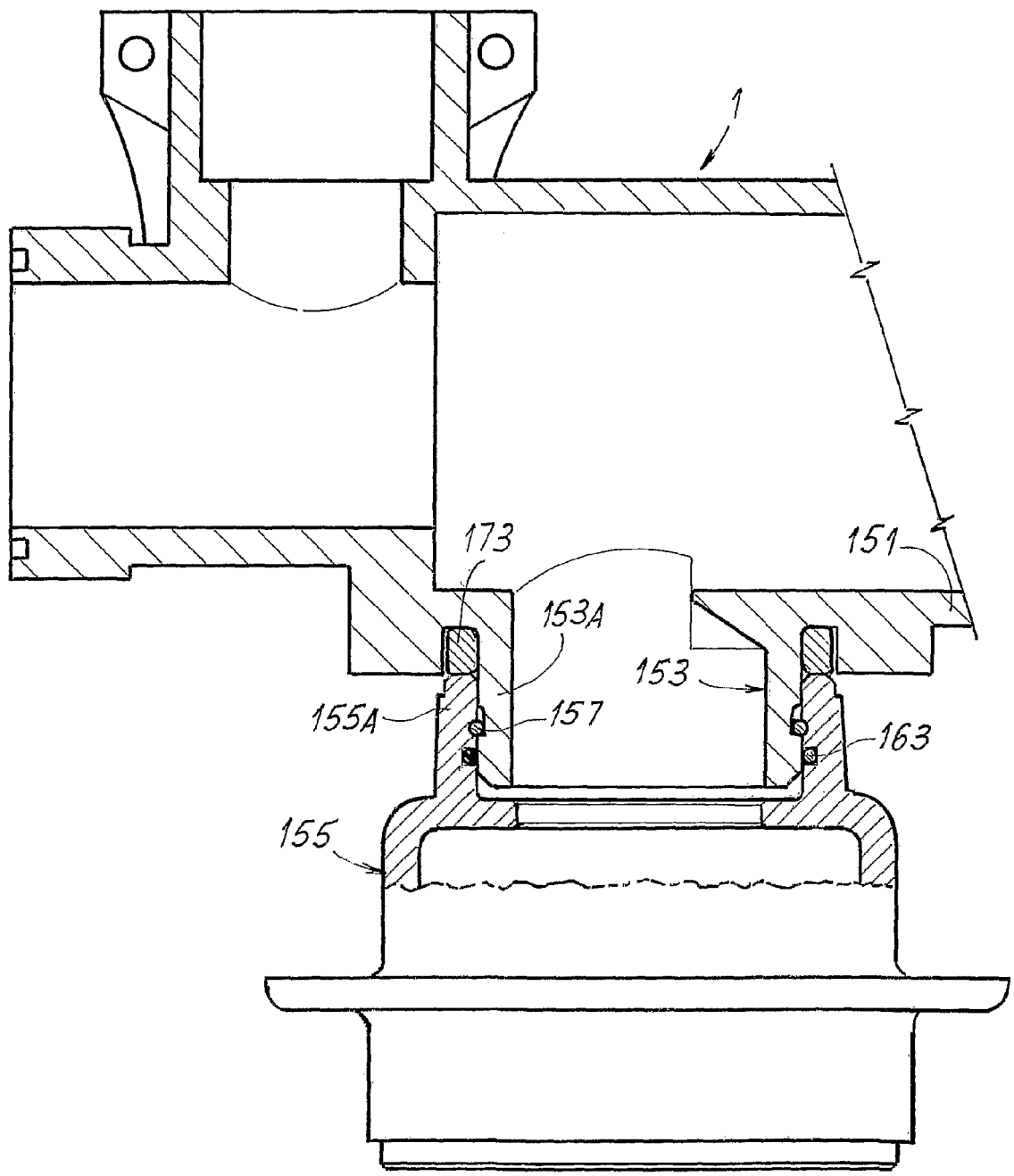

FIGS. 6 and 7 show a cross section of a modified embodiment of the invention. The same or equivalent parts are labeled with the same reference numbers. The main difference between the embodiment of FIGS. 6,7 and 1-5 respectively resides in where the forcing element is arranged. In the embodiment of FIGS. 6 and 7 said forcing element 175 is arranged in a seat provided between the front annular edge of the wall 155A and an annular recess in body 151, from which the wall 153 projects.

It is understood that the drawing only shows a possible embodiment of the invention, which can vary in forms and arrangements, without however departing from the scope of the concept underlying the invention, as better specified in the claims below. Any reference numerals in the appended claims are provided purely to facilitate reading thereof in the light of the above description and accompanying, drawings and do not in any way limit the scope of protection defined thereby.

The invention claimed is:

1. A device comprising:
    a multiway valve applied to a base, wherein said valve is constrained to said base with an arrangement, said arrangement comprising:
    a first mechanical element;
    a second mechanical element, said first mechanical element and said second mechanical element defining a compartment for holding a pressurized fluid when said first mechanical element is connected to said second mechanical element;
    a first substantially annular seat provided in a first wall defined by the first mechanical element;
    a second substantially annular seat provided in a second wall defined by the second mechanical element, said second substantially annular seat being positioned substantially opposite said first substantially annular seat when the two mechanical elements are assembled, the second wall being positioned inside the first wall;
    at least one filiform element forming a reciprocal blocking member of said first and second mechanical element, said filiform element being inserted in a filiform element space defined by said first seat and said second seat;
    at least one forcing member, which is insertable into and extractable from a forcing member space defined between two opposed surfaces belonging respectively to said first and to said second mechanical element when said first and second mechanical elements are coupled to one another with said filiform element being introduced in the filiform element space formed by said first and second seat, the insertion of said forcing element in said forcing member space forcing said first and said second mechanical elements to move with respect to one another, said first and second substantially annular seats being shaped such that insertion of the forcing member in said forcing member space causes blocking of the filiform element between the two substantially annular seats.

* * * * *